Nov. 14, 1939. R. S. ESTEY 2,179,657
CAMERA
Filed Oct. 15, 1937 3 Sheets-Sheet 1

Inventor.
ROGER S. ESTEY
by Harry H. Styll
Atty.

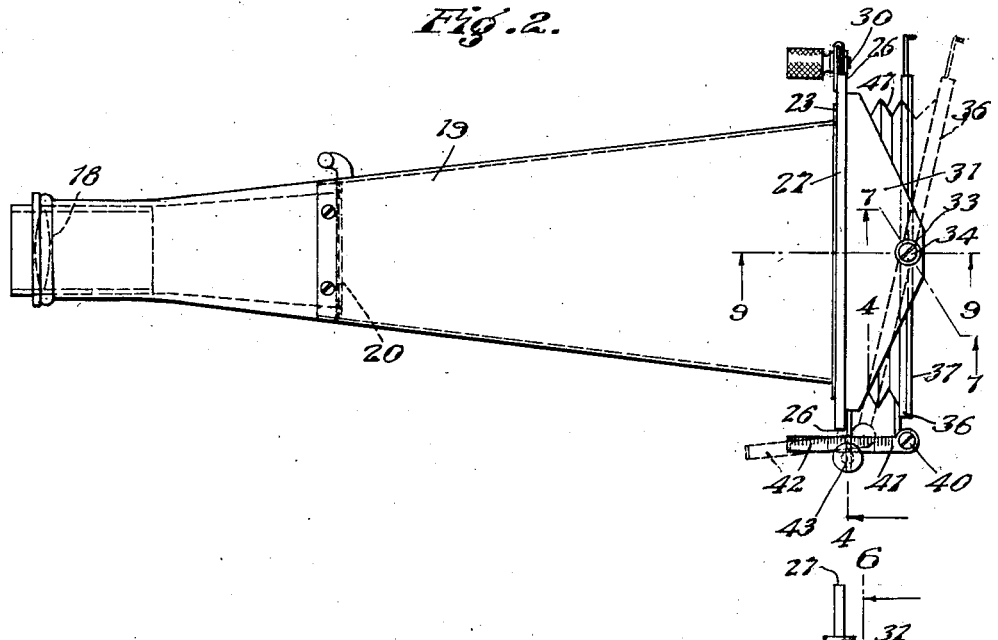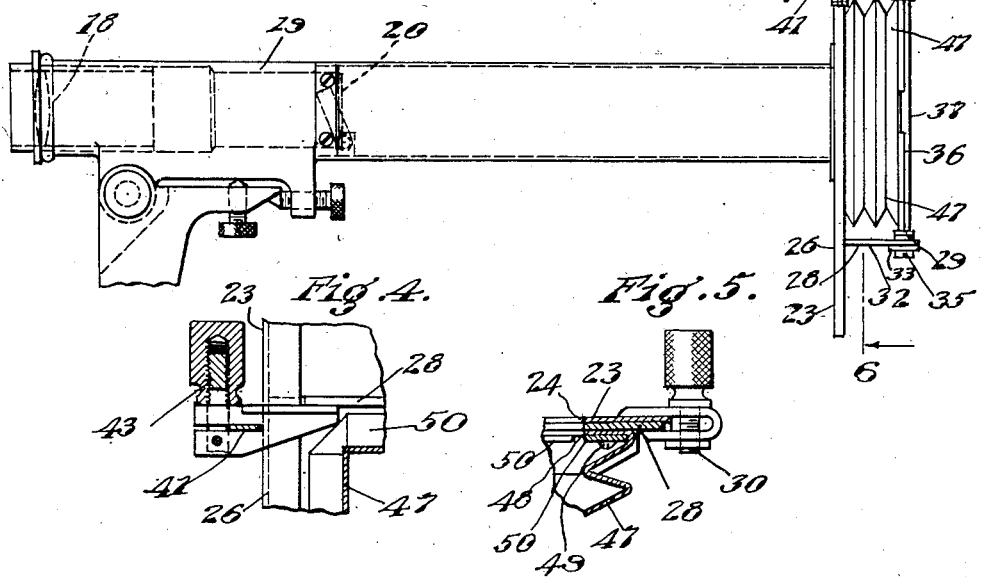

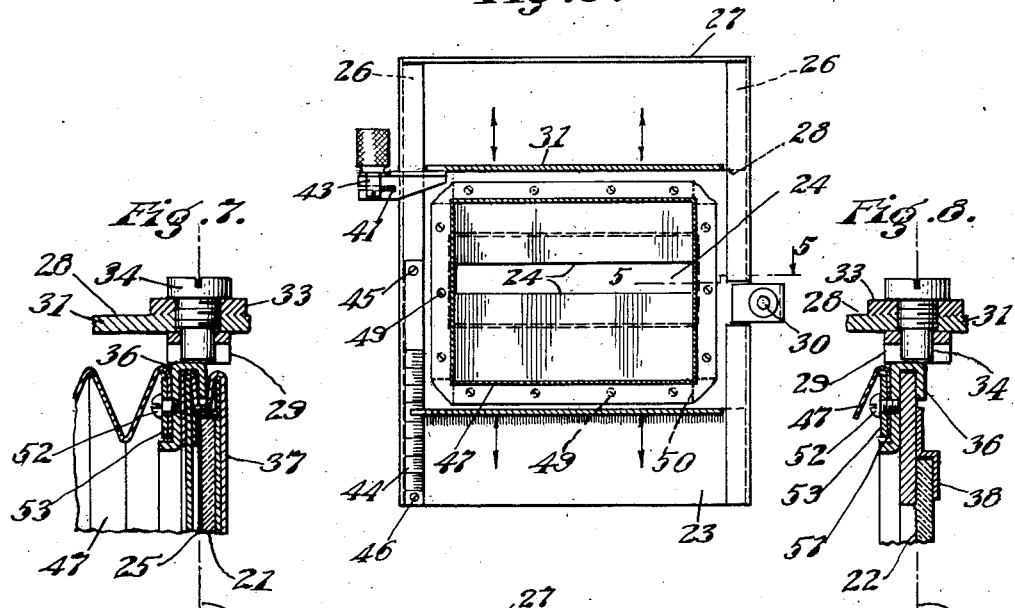

Patented Nov. 14, 1939

2,179,657

UNITED STATES PATENT OFFICE 2,179,657

CAMERA

Roger S. Estey, Buffalo, N. Y., assignor to Spencer Lens Company, Buffalo, N. Y., a corporation of New York Application October 15, 1937, Serial No. 169,249

6 Claims. (Cl. 95—11)

This invention relates to a camera which is to be used with a collimator and a prism or other light dispersing member to form a spectrograph for photographing spectra.

The principal object of the invention is to provide an improved form of camera for photographing a succession of spectra on one photographic plate, and so constructed that all parts of each successive spectrum may be accurately focused on the photographic plate without requiring an unduly bulky construction.

Other objects and advantages of the invention will become apparent from the following description taken in connection with the accompanying drawings, and it will be apparent that many changes may be made in the details of construction and the arrangement of parts shown and described without departing from the spirit of the invention to be expressed in the accompanying claims. I, therefore, do not wish to be limited to the exact details shown and described, as the preferred form of the invention has only been shown by way of illustration.

In cameras of this type adapted to photograph successive bands of spectra, the essential characteristics are: a camera body; a frame which is adapted to hold either a ground glass plate for focussing or a photographic plate for photographing a succession of spectra; means for raising or lowering this frame relatively to the camera body so as to enable a succession of spectra to be photographed; means for adjustably swinging said frame about an axis which is perpendicular of the spectrum bands so as to properly focus each part of each band, said axis preferably lying in the same plane in which is adapted to be situated the ground face of the ground glass plate or the emulsion face of the photographic plate; and suitable means, such as a bellows, for excluding extraneous light and yet allowing the frame to be swung about its axis of rotation.

In cameras of this type as heretofore constructed either the axis of rotation of the frame has not lain in the same plane as the plane of the emulsion side of the photographic plate, or the frame has been slidably mounted in a carriage which latter was pivoted to the camera body. In the former case the central part of the spectrum band is thrown out of focus every time the frame is swung about its axis. In the latter case either the carriage is mounted in a pair of trunnions on the camera body which trunnions must of necessity be far apart to accommodate the total excursion of the frame (which prevents the apparatus from being constructed in a neat, compact manner) or the carriage is mounted in a single, off-set bearing on the camera body and this requires a very heavy, clumsy bearing because of its off-set feature.

In the present invention the carriage slides directly in the camera body and is provided with a pair of trunnions which need only be spaced apart a sufficient distance to accommodate the frame. This renders the entire construction very compact, strong and neat. In addition, the axis of these trunnions lies in the same plane as the emulsion side of the photographic plate.

In the accompanying drawings,

Fig. 2 is a top plan view of the camera.

Fig. 3 is a side elevation of the camera.

Fig. 4 is an enlarged, fragmentary, vertical, transverse section through the one side of the camera, taken on line 4—4 of Fig. 2.

Fig. 5 is an enlarged, fragmentary, horizontal section through the other side of the camera, taken on line 5—5 of Fig. 6.

Fig. 6 is a vertical, transverse section through the outer end of the camera, taken on line 6—6 of Fig. 3.

Fig. 7 is an enlarged, fragmentary, vertical section through the outer end of the camera, taken on line 7—7 of Fig. 2 and showing a photographic plate holder and photographic plate in the position they occupy in the camera when a photograph of a spectrum is to be made.

Fig. 8 is an enlarged section similar to Fig. 7 but showing the photographic plate and photographic plate holder of Fig. 7 replaced by a ground glass plate holder and a ground glass plate in the position they occupy when focussing the camera.

Fig. 9 is an enlarged, fragmentary, vertical longitudinal section taken on line 9—9 of Fig. 2, but without either plate holder in place.

Figure 1:
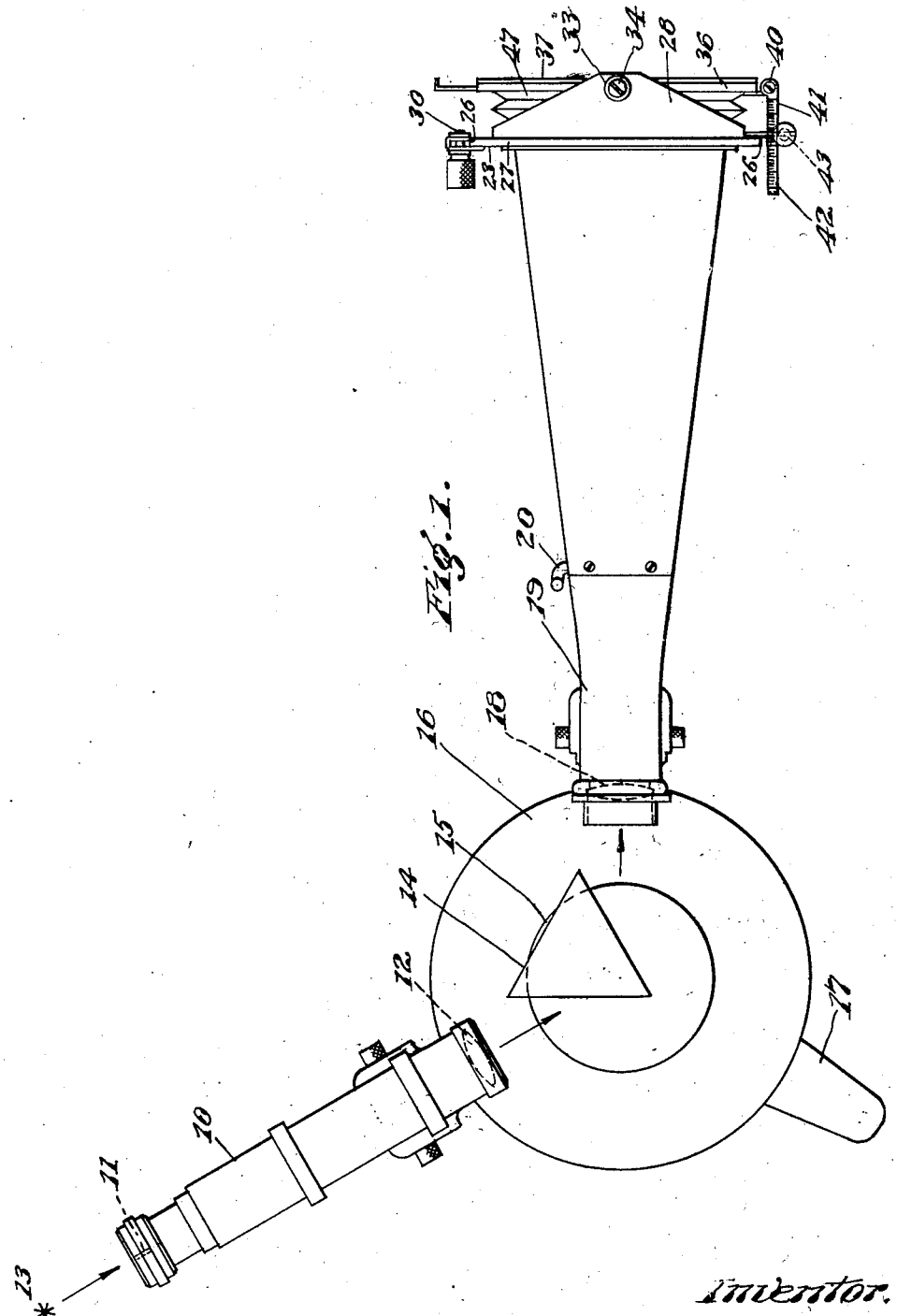
Fig. 1 is a diminutive top plan view of the camera and the rest of the parts which go to make up a complete spectograph.

Referring to the drawings, wherein similar characters of reference designate like parts throughout the several views, in Fig. 1 is shown a schematic top plan of a complete spectrograph constructed in accordance with my invention, and including the usual collimator 10 having the usual slit mechanism 11 and the collimator lens 12. This collimator may, of course, be replaced by a mirror or other means of obtaining a single beam of parallel compound light. As disclosed in the present application, illumination from some external source 13 passes into the slit 11 and through the body of the collimator and through the lens 12 and thence to one of the faces of the prism 14. This prism may be replaced, if desired, by any other light dispersing element such as a diffraction grating, and is suitably arranged on a vertically adjustable table 15 which is mounted upon a turn table 16 supported upon a base 17. It is to be understood that the camera in the particular form here shown is designed as an accessory to a spectrometer of conventional form, said spectrometer and its accessory camera constituting a spectrograph. For this reason a more simple method of supporting this prism 14 may be employed as far as the present invention is concerned.

As the beam of white or other compound light strikes the prism 14, it is refracted at different angles through the body of the prism and is broken into a plurality of beams of colored light of different wave length.

These beams then pass into the camera through the lens 18 which is arranged in the front end of the camera body 19. The latter is adjustably mounted upon the base 17 of the instrument in any suitable manner, such as shown in Fig. 3, and is provided with the usual shutter 20 for making the desired length of exposure of the spectrum upon the photographic plate 21 (see Fig. 7) arranged at the outer end of the camera body 19.

All of the apparatus thus far described is old and well known in the art and is deemed to need no further description here.

In photographing spectra it has been found that effective results can only be obtained in a convenient manner if the ground glass 22, upon which the spectrum is focused, can be so arranged that the central part of the spectrum may first be accurately focused on the central part of the ground glass and then the latter turned about this central part of the ground glass, as an axis, in the one or other direction for the purpose of bringing both ends of the spectrum into the clearest possible focus.

All apparatus which has been heretofore employed to effect this result has been either very cumbersome in construction or else has failed to provide means for accurately, and at the same time easily, focusing all parts of the spectrum on the ground glass plate. In the present invention this result is effected as follows:

To the outer end of the camera body 19 is secured a vertical end wall or plate 23 having a rectangular aperture 24 (see Figs. 6 and 9) arranged at its central portion so as to allow a rectangular, horizontally disposed spectrum band to pass through said slit 24 and to impinge either upon the front face of the ground glass 22, for purposes of focusing, or upon the emulsion face 25 of the photographic plate 21, for purposes of photographing. The upper edge of said end plate 23 is preferably turned horizontally rearwardly to form an upper flange 27, while the vertical side edges of this end plate 23 are bent rearwardly and then inwardly to form a pair of vertical guideways 26. Vertically slidable in these guideways 26 is a carriage 28, the latter preferably being constructed of sheet metal and held in any desired vertical position by means of a clamping screw 30, shown in detail in Fig. 5.
This carriage 28 is moved vertically in order to permit a succession of spectra to be exposed through the slit 24 and photographed on the photographic plate 21.

Secured integrally or otherwise (see Fig. 9)
to the rear face of said carriage 28 are horizon-
tally and outwardly extending brackets 31 and 32. Preferably welded at the outer ends of these brackets (for purposes of strength) are reinforcing washers 33 into which are threaded upper and lower pivot screws 34 and 35. Pivotally arranged on the latter are a pair of U-shaped plates 29 which are welded or otherwise suitably secured to the upper and lower edges of a frame 36. This construction permits said frame 36 to be pivoted, relatively to the carriage 28, about the vertical axes of said pivot screws 34 and 35. The frame 36 is adapted to receive either the photographic plate holder 37, shown in Fig. 7, or the ground glass plate holder 38, shown in Fig. 8. In either case, the front face of the light receiving plate (photographic plate 21 or ground glass plate 22) lies in the same plane in which lies the axis 39 of the pivot screws 34 and 35. This permits the operator of the spectograph to bring the central part of the ground glass plate 22 accurately into focus by suitable manipulation of the camera lens 18 and thereafter to tilt said ground glass plate about its central vertical pivots 34 and 35 (to some such oblique position as that indicated by dotted lines in Fig. 2) so as to bring both ends of the spectrum into accurate focus. Then, when this ground glass plate 22 is replaced by a photographic plate 21, the resulting exposure of each portion of the entire length of the spectrum will be in accurate focus.

Suitable means is provided for holding the frame 36 in any desired oblique position. This may be effected as shown in Fig. 2 by pivotally connecting at 40 to the outer end of said frame 36 a clamping bar 41 which preferably has a suitable scale 42 inscribed thereon to permit of definitely indexing the degree of angularity of the frame 36 relatively to the slide 28 upon which it is pivoted. This clamping bar 41 is held firmly in any desired position by a clamping screw 43 (see Fig. 4) which is connected with the slide 28, so that, after the proper oblique position of the frame 36 has been obtained and the clamping screw 43 tightened, the slide 28, together with the frame 36 and its appurtenances, may be moved vertically without affecting the adjustment of said frame 36 relatively to said carriage 28. The vertical position of said carriage 28 relative to the end plate 23 of the camera body may be indexed by the scale 44 which is secured by screws 45, 46 to said end plate 23. After said carriage has been moved to the desired vertical position, it is clamped in place by the clamping screw 30.

To make a light tight fit between the carriage 28 and the frame 36 a suitable flexible bellows 47 is provided, the front inwardly turned flange 48 of said bellows, as best shown in Fig. 9, being suitably secured by screws 49 and reinforcing strips 50 to the rear face of the carriage 28, while the inwardly turned rear flange 51 of said bellows is suitably secured by screws 52 and reinforcing strips 53 to the inner face of the frame 36. If desired, any other suitable light tight connection between the carriage 28 and frame 36 may be substituted for the said bellows 47.

It is to be particularly noted in the present invention that the pivots 34, 35 are positioned in juxtaposition to the upper and lower edges of the frame 36 and travel with said frame. This provides a light, compact and strong construction. Also the common axis of these pivots 34, 35 lies in the same plane as the central vertical portion of the front face of either the ground glass plate

22 or the front emulsion face 25 of the photographic plate 21. This enables the central part of the light receiving plate to be maintained in focus, while its end portions are being brought into proper focus. It is also to be noted that the bellows 47 is interposed between the rear face of the carriage 28, and the front face of the frame 36. This enables a size of bellows to be used which is just large enough to accommodate the rectangular open front face of the frame 36.

From the foregoing description it will be seen that a very simple, efficient and economical means has been provided for accomplishing all the objects and advantages of the invention and, while I have illustrated and described the embodiment of my invention which I at present prefer, it will be understood that the invention may be otherwise embodied and practiced within the scope of the following claims.

Having described my invention, I claim:

1. In a device for photographing spectra, a source of illumination, a base, a collimating member supported on said base at one side thereof and disposed to receive light from said source, a dispersing member rotatably supported on said base independently of said collimating member and adapted to receive collimated light therefrom and to disperse said light into a spectrum, and a camera member also supported on said base at one side thereof and positioned so as to receive the spectrum formed by said dispersing member, said camera member including a focusing lens and an exposure shutter adjacent said camera support, sensitive plate supporting means vertically pivoted substantially midway across the rear of said camera, a calibrated actuating member pivoted on said supporting means for adjusting said plate supporting means about its pivot, and a locking member adapted to act on said actuating member to hold said plate supporting means in desired adjusted position, whereby said plate supporting means may be pivoted about said vertical pivot by movement of said actuating member to provide the angled surface necessary to properly focus the entire spectrum, and may be locked in desired position by said locking member.

2. In a device for photographing spectra, a source of illumination, a base, a collimating member supported on said base at one side thereof and disposed to receive light from said source, a dispersing member rotatably supported on said base independently of said collimating member and adapted to receive collimated light therefrom and to disperse said light into a spectrum, and a camera member also supported on said base at one side thereof and positioned so as to receive the spectrum formed by said dispersing member, said camera member including a focusing lens and an exposure shutter adjacent said camera support, sensitive plate supporting means vertically pivoted substantially midway across the rear of said camera, a calibrated actuating member pivoted on said supporting means for adjusting said plate supporting means about its pivot, and a locking member adapted to act on said actuating member to hold said plate supporting means in desired adjusted position, whereby said plate supporting means may be pivoted about said vertical pivot by movement of said actuating member to provide the angled surface necessary to properly focus the entire spectrum, and may be locked in desired position by said locking member, said plate supporting means, the members to which it is pivoted, and the said actuating means being slidable vertically as a unit with respect to the body of the camera and having scale means associated therewith to indicate the extent of said vertical adjustment, whereby a plurality of spectra may be photographed on a single sensitive plate.

3. In a photographic attachment to a spectrometer, an enclosed camera body having at one end thereof a focusing lens and a shutter, and at the other end a vertical plate having a rectangular aperture therethrough, with said vertical plate being attached to said camera body about said aperture, and a sensitive plate supporting unit attached to said vertical plate for sliding vertical movement relative thereto, said supporting unit including a frame member vertically pivoted to upper and lower portions of said supporting unit, actuating means pivoted on said frame member, locking means adapted to lock said actuating means to the said vertical plate to hold said frame in desired pivoted position, and a light-tight bellows member between said frame and said vertical plate.

4. A camera to be used with a collimator and a dispersing member to form a spectrograph and comprising: a camera body; a carriage arranged on said camera body so as to slide relatively thereto in one certain direction; a frame pivoted on said carriage, the axis of the pivots of said frame lying in a line disposed parallel to the direction of the movement of the carriage; and a plate holder detachably secured to said frame and adapted to hold a plate.

5. A camera to be used with a collimator and a dispersing member to form a spectrograph and comprising: a camera body, a carriage vertically, slidably arranged at the outer end of said camera body, a frame pivoted on said carriage, the axis of the pivotal connection being vertical; a plate holder detachably connected with said frame and adapted to hold a light receiving plate whose front face lies in the same vertical plane as the axis of the frame pivots; and a bellows connected at its opposite ends to said carriage and to said frame.

6. A camera to be used with a collimator and a dispersing member to form a spectrograph and comprising: a camera body having an optical axis; a carriage slidably arranged on said camera body so as to slide in a direction perpendicular to said optic axis; a frame pivoted on said carriage, the axis of the pivots of said frame being disposed parallel to the direction of movement of said carriage relatively to said camera body; and a plate holder detachably secured to said frame and adapted to hold a photographic plate.

ROGER S. ESTEY.